(12) United States Patent
Ohara

(10) Patent No.: US 9,292,773 B2
(45) Date of Patent: *Mar. 22, 2016

(54) IMAGE DISPLAY APPARATUS, PRINTING SYSTEM, AND PROGRAM CONFIGURED TO PRINT IMAGE PROJECTED BY THE IMAGE DISPLAY APPARATUS

(71) Applicant: CANON KABUSHIKI KAISHA, Tokyo (JP)

(72) Inventor: Shinya Ohara, Utsunomiya (JP)

(73) Assignee: CANON KABUSHIKI KAISHA, Tokyo (JP)

(\*) Notice: Subject to any disclaimer, the term of this patent is extended or adjusted under 35 U.S.C. 154(b) by 0 days.

This patent is subject to a terminal disclaimer.

(21) Appl. No.: 14/462,796

(22) Filed: Aug. 19, 2014

(65) Prior Publication Data

US 2014/0355012 A1 Dec. 4, 2014

Related U.S. Application Data

(63) Continuation of application No. 13/541,915, filed on Jul. 5, 2012, now Pat. No. 8,836,982.

(30) Foreign Application Priority Data

Jul. 11, 2011 (JP) .................................. 2011-153081

(51) Int. Cl.
  *G06K 15/02* (2006.01)
  *G06F 3/12* (2006.01)
  *H04N 1/405* (2006.01)

(52) U.S. Cl.
  CPC .......... *G06K 15/1885* (2013.01); *G06F 3/1204* (2013.01); *G06F 3/1208* (2013.01);

(Continued)

(58) Field of Classification Search
  CPC .............................. G06F 3/1204; G06F 3/1284
  USPC ............... 358/1.1, 1.9, 1.13, 1.14, 1.15, 1.18; 347/157, 173, 345; 382/106, 108, 154, 382/195
  See application file for complete search history.

(56) References Cited

U.S. PATENT DOCUMENTS 5,940,049 A 8/1999 Hinman et al.
7,280,157 B2 10/2007 Yamada et al.
(Continued)

FOREIGN PATENT DOCUMENTS

JP 2004312706 A 11/2004
JP 2006126480 A 5/2006

OTHER PUBLICATIONS

Non-Final Office Action cited in U.S. Appl. No. 13/541,915 on Feb. 10, 2014.
(Continued)

*Primary Examiner* — Gabriel Garcia
(74) *Attorney, Agent, or Firm* — Rossi, Kimms & McDowell LLP

(57) ABSTRACT

The printing system includes a computer and an image display apparatus. When receiving the printing condition from the image display apparatus, the computer generates print data based upon a printing condition and image data having a higher resolution among a second image data stored in a second memory in the computer and the first image data stored in a first memory in the computer, which corresponds to the identification information contained in the printing condition, and sends the print data to a printer connected to the computer for printing.

12 Claims, 3 Drawing Sheets

(52) U.S. Cl.
CPC ............ G06F3/1247 (2013.01); G06F 3/1284 (2013.01); G06K 15/1872 (2013.01); *G06K 2215/0057* (2013.01)

(56) References Cited

U.S. PATENT DOCUMENTS

| | | | |
|---|---|---|---|
| 7,312,787 | B2 | 12/2007 | Fujioka et al. |
| 2001/0019325 | A1 | 9/2001 | Takekawa |
| 2003/0043399 | A1* | 3/2003 | Johnston et al. ............. 358/1.13 |
| 2006/0192778 | A1 | 8/2006 | Otani |
| 2011/0255116 | A1* | 10/2011 | Inoue et al. ................. 358/1.13 |

OTHER PUBLICATIONS

Notice of Allowance cited in U.S. Appl. No. 13/541,915 on May 16, 2014.

* cited by examiner

IMAGE DISPLAY APPARATUS, PRINTING SYSTEM, AND PROGRAM CONFIGURED TO PRINT IMAGE PROJECTED BY THE IMAGE DISPLAY APPARATUS

BACKGROUND OF THE INVENTION

1. Field of the Invention

The present invention relates to an image display apparatus, a printing system, and a program, configured to print an image projected by the image display apparatus.

2. Description of the Related Art

When a presenter projects an image received from a personal computer ("PC") for a presentation, he may be requested to print the projected image from a viewer. Then, in the conventional system, the presenter takes the trouble to move to the PC, to manipulate the PC, and to print the image through the printer that is connected to the PC.

In this case, when part of the projected image is requested, the presenter has to set a print area on the PC but the display screen on the PC is not projected on the projected screen and thus it may take a long time to set the print area desired by the viewer. In addition, the PC located at the presentation stage is not usually his own PC, and thus the manipulation is unfamiliar.

As disclosed in Japanese Patent Laid-Open Nos. ("JPs") 2006-126480 and 2004-312706, it is conceivable to directly connect the projector with the printer and to send print data from the projector to the printer for printing.

However, the resolution of the image stored in the PC is sometimes higher than that of the projected image which the projector displays, and the viewer may not obtain an image having a better resolution according to the configurations of the JPs 2006-126480 and 2004-312706. In addition, when the projector sends the image data to the printer, a data amount which the projector sends increases and the burden of the projector increases because the projector must convert data into a printable format for the printer.

SUMMARY OF THE INVENTION

The present invention provides an image display apparatus, a printing system, and a program, configured to print an image with a good resolution projected by the image display apparatus through a manipulation at the image display apparatus while a burden of the image display apparatus is alleviated.

A printing system according to one aspect of the present invention includes a computer that includes a controller, a first memory configured to store first image data, a first image processor configured to process the first image data and to generate second image data, and a second memory configured to temporarily store the second image data, and an image display apparatus that is connected to the computer and includes an image output unit configured to output an image corresponding to the second image data output from the computer, and a second image processor configured to set a printing condition that contains identification information that identifies the second image data and coordinate information of a print area in the image. When receiving the printing condition from the image display apparatus, the controller of the computer generates print data based upon image data having a higher resolution among the second image data stored in the second memory and the first image data stored in the first memory, which corresponds to the identification information contained in the printing condition and the printing condition, and sends the print data to a printer connected to the computer for printing.

Further features of the present invention will become apparent from the following description of exemplary embodiments with reference to the attached drawings.

DESCRIPTION OF THE EMBODIMENTS

Figure 1:
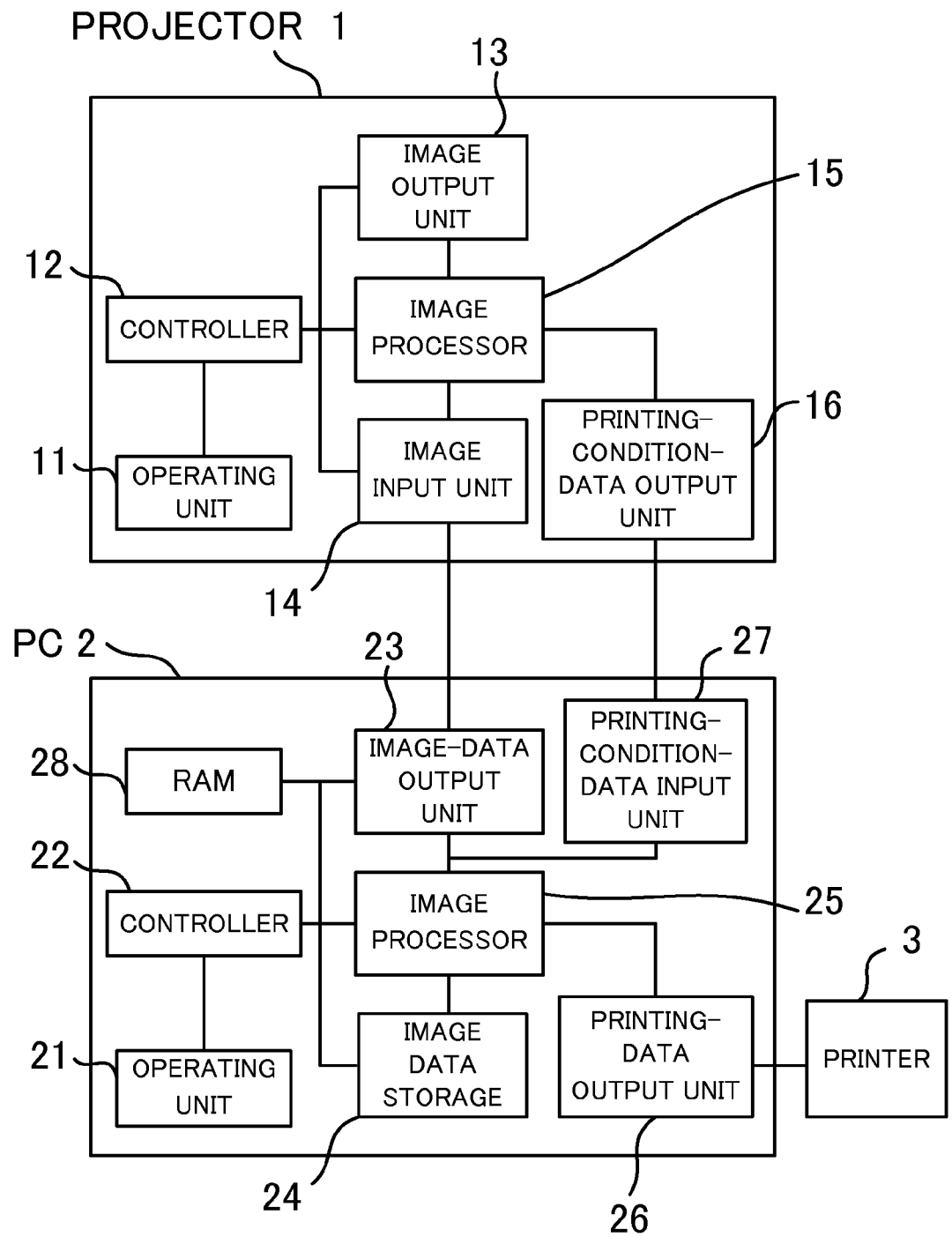
FIG. 1 is a block diagram of a printing system according to this embodiment.

FIG. 1 is a block diagram of a printing system configured to print an image projected by an image display apparatus. The following description discusses a projector (image projecting apparatus) as one example of an image display apparatus but the present invention is applicable to another image display apparatus, such as a television.

The printing system includes a projector (image display apparatus) 1, a personal computer ("PC") 2, and a printer 3. The PC 2 is connected to the projector 1 and the printer 3.

The projector 1 includes an operating unit 11, a controller 12, an image output unit 13, an image input unit 14, an image processor (second image processor) 15, and a printing-condition-data output unit 16.

The operating unit 11 accepts a variety of manipulations such as an input manipulation and a print preview instruction of a printing condition used to print a projected image. For example, it may be, but not limited to a button, a dial, a keypad, or a variety of pointing devices. The printing condition contains, but is not limited to, identification information used to identify a projected image, a print instruction, a print area, a print number, a magnification, a resolution, a color/monochromatic printing designation, and a size or type of a printing paper. The printing condition does not contain information of image data of the projected image.

The controller 12 can communicate with the PC 2 and controls each module in the projector 1.

The image output unit 13 is a projection lens (unit) configured to project an image on a display screen and a liquid crystal display. The image output unit 13 can display a projected image, a print area set in the projected image, another printing condition, a print preview, optical information of the projector 1 (aspect ratio, zooming ratio, etc.). The image output unit 13 has a print preview function configured to display an image contained in a print area without displaying the whole projected image.

The image input unit 14 is a connector from which (second) image data is input from an external unit, such as the PC 2, and contains a USB terminal, and a video input terminal.

The (second) image processor 15 serves to convert and process input image data, to provide a digital zoom function to change (enlarge or reduce) a magnification of a projected image, and to output printing condition data.

The printing-condition-data output unit 16 outputs data of a printing condition output from the image processor 15 to an external device, such as the PC 2. In this embodiment, the projector 1 can output a printing condition to the PC 2 from the printing-condition-data output unit 16, but the PC 2 already possesses the image data of the projected image, and thus the projector 1 does not sends that information.

The PC 2 includes an operating unit 21, a controller 22, an image-data output unit 23, an image data storage (first memory) 24, a (first) image processor 25, a print-data output unit 26, a printing-condition-data input unit 27, and a RAM (second storage) 28.

The operating unit 21 includes a keyboard and a pointing device configured to accept a variety of input manipulations. The controller 22 controls each module, compares the resolution, and selects the image data used for the print data based upon the comparison result, as described with reference to FIG. 3.

The image-data output unit 23 outputs image data to the projector 1 and a display (not illustrated). The image data storage 24 is a (first) memory configured to store first image data as original image data.

The image processor 25 can process first image data stored in the image data storage 24, and convert the first image data into the second image data displayable by the projector 1 or the display (not illustrated). The image processor 25 can generate print data based upon the printing condition received by the projector 1 and the image data stored in the image data storage 24 or RAM 28 selected by the controller 22. The print data is information that contains image data, such as a size and density of halftone dot, representing the whole or part of the projected image and the information of the printing condition.

The print-data output unit 26 outputs the print data generated by the image processor 25 to the printer 3. The printing-condition-data input unit 27 receives information of the printing condition from the printing-condition-data output unit 16 in the projector 1. The RAM 28 is a (second) memory configured to temporarily store second image data as output image data output from the image-data output unit 23.

A description will be given of an operation when a desired print area of a projected image is printed by this printing system.

Figure 2B:
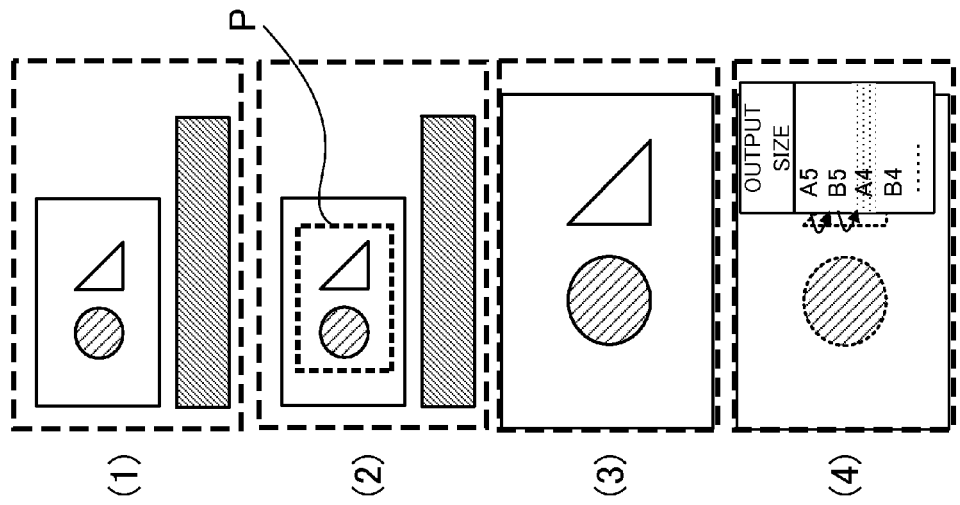
FIG. 2B is an illustration of a screen displayed by the projector.
Figure 2A:
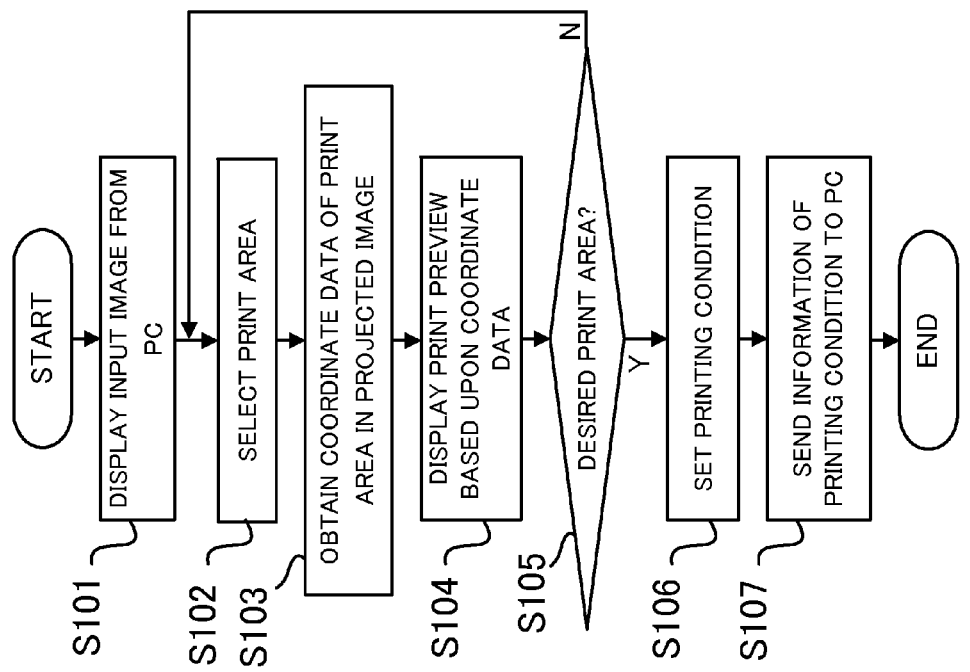
FIG. 2A is a flowchart for explaining an operation of a projector illustrated in FIG. 1.
Figure 3:
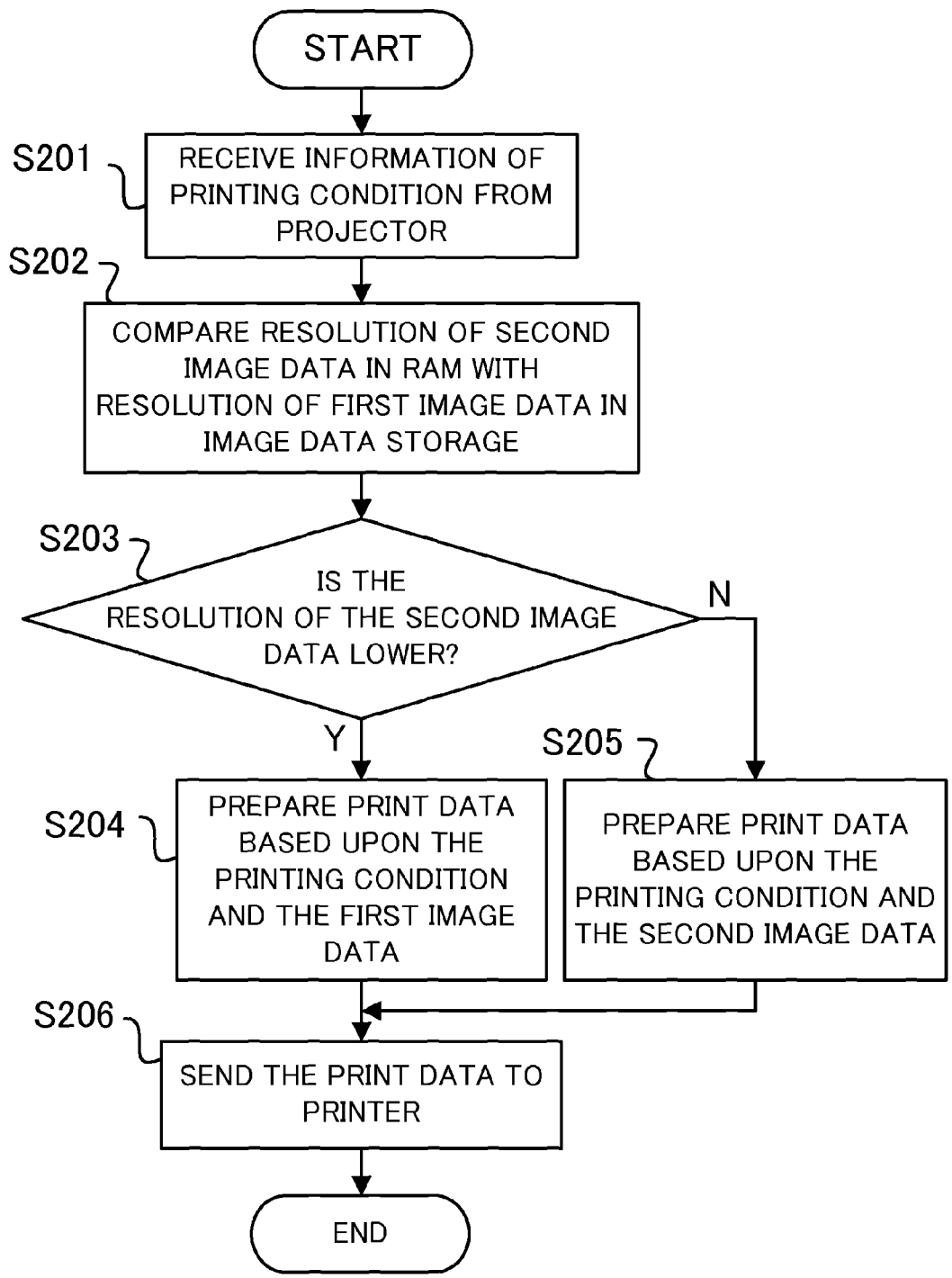
FIG. 3 is a flowchart for explaining an operation of a PC illustrated in FIG. 1.

FIG. 2A is a flowchart illustrating an operation of the projector 1. FIG. 2B is an illustrative screen displayed by the projector 1. FIG. 3 is a flowchart for explaining an operation of the PC 2 after the printing information is sent to the PC 2 from the projector 1. In FIGS. 2A and 3, "S" stands for a step. This flow can be implemented as a program used to enable a processor (microcomputer) to execute each step.

A description will now be given with reference to FIG. 2A. The projector 1 is powered on by the operating unit 11, and receives image data output from the image-data output unit 23 in the PC 2 through the image input unit 14. The controller 12 instructs the image processor 15 to process the image data. As illustrated in a screen (1) in FIG. 2B, the image corresponding to the received image data is displayed on the image output unit 13 (S101).

Next, the controller 12 sets a desired print area in the projected image via a manipulation from the operating unit 11 and the image processor 15 (S102). For example, in a screen (2) of FIG. 2B, a rectangular dotted area P encloses a circle and a triangle and is set as a print area.

Next, the controller 12 obtains coordinate information of the projected image through the image processor 15 (S103). For example, in the screen (2) of FIG. 2B, the controller 12 obtains coordinates of four corner positions of the dotted area P. A coordinate acquiring method is not limited, and only two diagonal coordinates in the rectangular dotted area P may be acquired.

Next, the controller 12 cuts the print area out of the projected image based upon the coordinate information of the obtained print area, produces a print preview by enlarging or reducing the print area using the digital zoom function, and displays the print preview on the image output unit 13 (S104).

For example, in a screen (3) in FIG. 2B, the controller 12 enlarges and displays, as the print preview, of the triangle and the circle in the dotted area.

Next, the controller 12 requests an operator to confirm whether the image displayed in the print preview is a desired print area (S105), and returns to S102 if necessary (N of S105). Then, the operator again selects the print area.

In operating the PC to print the screen projected by the projector, the conventional viewer cannot confirm the print preview on the display of the PC and a selection of the print area may contain an error. On the other hand, this embodiment enables the viewer of the projector to confirm the print preview screen and thus reduces a printing error.

When it is confirmed that the image displayed in the print preview is the desired print area (Y of S105), the controller 12 prompts the operator to set another printing condition (S106). For example, in the screen (4) in FIG. 2B, the controller 12 accepts the selection of the A4 size of the printing paper.

Next, the controller 12 sends the print data containing the printing condition and the coordinate information of the print area of the display image from which the information of the printing condition is obtained, from the printing-condition-data output unit 16 to the printing-condition-data input unit 27 in the PC 2 (S107). S107 is performed by the operator when he presses or clicks a "printing" button in the operating unit 11.

Thus, according to this embodiment, the user does not have to move from the projector 1 to the PC 2, and thus the printing operability improves. As a result, the flow proceeds to FIG. 3.

Initially, the controller 22 receives the information of the printing condition with a print command from the projector 1 via the printing-condition-data input unit 27 (S201).

Next, the controller 22 compares the resolution of the second image data stored in the RAM 28 with the resolution of the first image data stored in the image data storage 24 via the image processor 25 (S202). The compared image is specified based upon the identification information of the image contained in the printing condition.

When the resolution of the second image data is lower than that of the first image data (Y of S203), the controller 22 prepares the print data based upon the first image data and the printing condition received from the projector 1 via the image processor 25 (S204).

On the other hand, when the resolution of the second image data is as high as or higher than that of the first image data (N of S203), the controller 22 prepares the print data via the image processor 25 based on the second image data and the printing condition received from the projector 1 (S205).

Thus, the controller 22 generates print data via the image processor 15 based on the printing condition and the image data having a higher resolution among the first image data and the second image data.

Next, the controller 22 sends the prepared print data from the print-data output unit 26 to the printer 3 (S206). As a result, the printer 3 prints the desired print area in the projected image with a good resolution in accordance with the print data.

According to this embodiment, in printing the projected image, a user of the projector 1 does not have to move to the PC 2 so as to manipulate the PC 2, but the PC 2 selects image data having a higher resolution. Thus, the resolution of the image to be printed can be improved. In addition, while the projector 1 sends the printing condition but no image data, and thus its burden is alleviated. Moreover, for example, while JPs 2006-126480 and 2004-312706 need image processing configured to convert image data into a format suitable for printing of the printer, this embodiment does not require this image processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-153081, filed Jul. 11, 2011 which is hereby incorporated by reference herein in its entirety.

What is claimed is:

1. An output system comprising:
a computer that includes a controller, a first memory configured to store first image data, a first image processor configured to process the first image data and to generate second image data by processing the first image data, and a second memory configured to temporarily store the second image data; and
an image display apparatus that is connected to the computer and includes an image display unit configured to display an image corresponding to the second image data output from the computer, and a second image processor configured to set an output condition that contains identification information that identifies the second image data and coordinate information of an output area in the image,
wherein when receiving the output condition from the image display apparatus, the controller of the computer generates output data based upon the output condition and image data having a higher resolution among the second image data stored in the second memory and the first image data stored in the first memory, which corresponds to the identification information contained in the output condition, and sends the output data to an output unit connected to the computer for output.

2. The output system according to claim 1, wherein the output condition contains a size of a paper to be output by the output unit.

3. The output system according to claim 1, wherein the image display unit of the image display apparatus has an output preview function configured to display an image contained in the output area.

4. The output system according to claim 1, wherein the second image processor in the image display apparatus serves to change a magnification of an image to be projected.

5. A non-transitory machine readable storage medium storing a program used for an output system that includes:
a computer that includes a controller, a first memory configured to store first image data, a first image processor configured to process the first image data and to generate second image data by processing the first image data, and a second memory configured to temporarily store the second image data; and
an image display apparatus that is connected to the computer and includes an image display unit configured to display an image corresponding to the second image data output from the computer, and a second image processor configured to set an output condition that contains identification information that identifies the second image data and coordinate information of an output area in the image,
wherein the program enables the computer to:
select, when receiving the output condition from the image display apparatus, image data having a higher resolution among the first image data stored in the first memory and the second image data stored in the second memory, which corresponds to the identification information contained in the output condition;
generate output data based upon the output condition and the image data that has been selected; and
send the output data to an output unit connected to the computer for output.

6. An image display apparatus configured to communicate with a computer that includes a controller, a first memory configured to store first image data, a first image processor configured to process the first image data and to generate second image data by processing the first image data, and a second memory configured to temporarily store the second image data, the image display apparatus comprising:
an image display unit configured to display an image corresponding to the second image data output from the computer; and
a second image processor configured to set an output condition that contains identification information that identifies the second image data and coordinate information of an output area in the image,
wherein the image display apparatus is configured to send the output condition to the computer whereby the controller of the computer generates output data based upon the output condition and image data having a higher resolution among the second image data stored in the second memory and the first image data stored in the first memory, which corresponds to the identification information contained in the output condition, and sends the output data to an output unit connected to the computer for output.

7. An image display apparatus according to claim 6, wherein the image display unit of the image display apparatus enlarges and displays the output area.

8. An output system comprising:
a computer that includes a first image processor configured to process first image data and to generate second image data by processing the first image data; and
an image display apparatus that is connected to the computer and includes an image display unit configured to display an image corresponding to the second image data output from the computer,
wherein when receiving an output condition from the image display apparatus, the computer generates output data based upon the output condition and image data having a higher resolution among the first image data and the second image data, which corresponds to identification information contained in the output condition, and sends the output data to an output unit connected to the computer for output.

9. The output system according to claim 8, wherein the image display apparatus has an output preview function configured to display an image contained in an output area.

10. The output system according to claim 8, wherein the image display apparatus is configured to change a magnification of an image to be projected.

11. A non-transitory machine readable storage medium storing a program used for an output system that includes:
a computer that includes a first image processor configured to process first image data and to generate second image data by processing the first image data; and
an image display apparatus that is connected to the computer and includes an image display unit configured to display an image corresponding to the second image data output from the computer,
wherein the program enables the computer to generate, when receiving an output condition from the image display apparatus, output data based upon the output condition and image data having a higher resolution among the first image data and the second image data, which corresponds to identification information contained in the output condition, and send the output data to an output unit connected to the computer for output.

12. An image display apparatus configured to communicate with a computer that includes a first image processor configured to process first image data and to generate second image data by processing the first image data, the image display apparatus comprising:

an image display unit configured to display an image corresponding to the second image data output from the computer; and a sending unit configured to send an output condition to the computer, wherein when the computer receives the output condition sent by the sending unit, the image display apparatus enables the computer to generate output data based upon the output condition and image data having a higher resolution among the first image data and the second image data, which corresponds to identification information contained in the output condition, and send the output data to an output unit connected to the computer for output.

* * * * *